Figure 1:
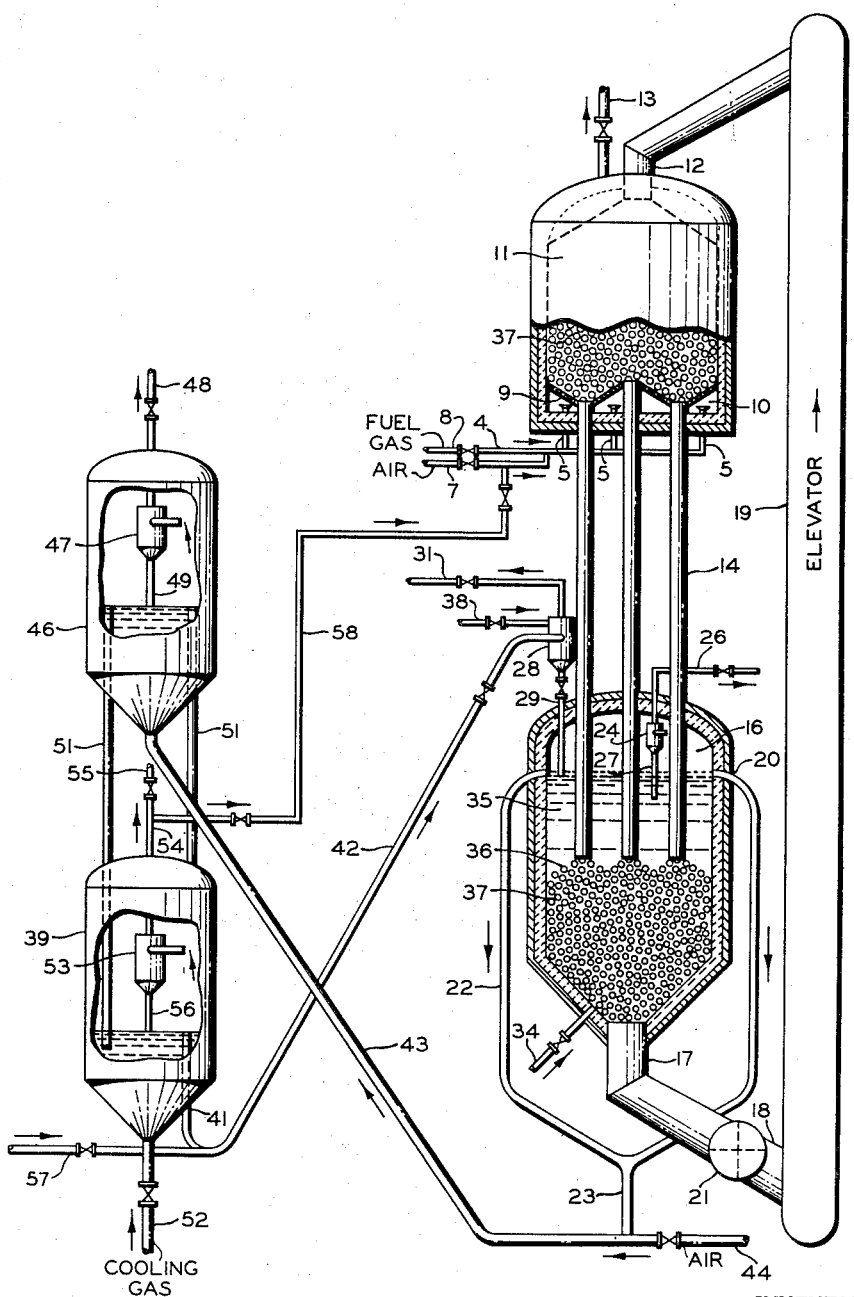

INVENTORS
C. E. ALLEMAN
H. A. DUTCHER
BY Hudson & Young
ATTORNEYS

United States Patent Office 2,776,249
Patented Jan. 1, 1957

2,776,249

PROCESS FOR CONVERSION OF REACTANT MATERIALS WITH THE USE OF HEATED PEBBLES

Harris A. Dutcher, Bartlesville, Okla., and Carl E. Alleman, Etter, Tex., assignors to Phillips Petroleum Company, a corporation of Delaware Application December 19, 1949, Serial No. 133,851

6 Claims. (Cl. 196—55)

This invention relates to the conversion of reactant materials at elevated temperatures. In one embodiment this invention relates to the conversion of a gaseous reactant material and the efficient quenching of reaction products thus formed. In another embodiment this invention relates to a novel heat transfer process providing for the efficient conversion of a reactant material and for quickly quenching the resulting reaction products.

Broadly, this invention provides for the conversion of a reactant material at an elevated temperature such as from 500 to 4500° F., and for quickly quenching the resulting reaction product in the same chamber. Our invention is often applied to the conversion of hydrocarbons, although we can conduct any desired conversion involving vaporous nonhydrocarbon reactants, such as for example the oxidation of nitrogen to produce nitric oxide, the production of hydrogen cyanide from carbon monoxide and ammonia, and the like.

In a preferred form, our invention provides for utilization of apparatus of the pebble heater type. Conversion processes which are carried out in so called pebble heater apparatus utilize a fluent mass of solid heat exchange material, which mass is heated to a high temperature by passing hot gas therethrough in a first direct heat exchange step and is then caused to contact gaseous reactant materials, furnishing heat thereto in a second direct heat exchange step. The conventional pebble heater apparatus generally comprises two chambers which may be disposed in substantially vertical alignment. The solid heat exchange material is introduced into the upper portion of the first chamber. That material forms a moving bed of solid heat exchange material which flows downwardly through the chamber in direct heat exchange with hot gases. The solid heat exchange material is thereby heated to a high temperature, and is then passed to a second chamber in which the hot solid heat exchange material is caused to contact the gaseous reactant materials in a second direct heat exchange relation, furnishing heat for the treatment or conversion of the gaseous materials.

Conventional pebble heater chambers of pebble heaters apparatus are generally formed as cylinders in which a solid heat exchange material is collected in the form of a moving bed. The hot gases are passed upwardly through the cylindrical bed, sometimes being introduced thereinto at the periphery of the bed and at its lower end, and are sometimes introduced through a refractory arch which supports the moving pebble bed. Alternatively, heat may be supplied to the heating chamber by supplying a fuel to the lower portion of the pebble bed within the heater chamber and burning the fuel on the surface of the pebbles so as to heat the pebbles by combustion and further heating the pebbles by passing the resulting combustion gas upwardly through the down-flowing fluent mass of pebbles. The heated pebbles are introduced into the upper portion of a reaction chamber and reactant materials are introduced into the lower portion of the reaction chamber and are caused to flow upwardly through the down-flowing fluent hot pebble mass therein, thereby obtaining the heat required for thermal conversion of the reactant materials. Reaction products are removed from the upper portion of the reaction chamber generally at points above the top surface of the pebble bed.

Solid heat exchange material which is conventionally used in pebble heater apparatus is generally called "pebbles." The term pebbles as used herein denotes any solid refractory material of flowable size and form, having strength, which is suitable to carry large amounts of heat from the pebble heating chamber to the reaction chamber without rapid deterioration or substantial breaking. Pebbles conventionally used in pebble heater apparatus are substantially spherical in shape and range from about 1/8 inch to about 1 inch in diameter. In a high temperature process, pebbles having a diameter of between about 1/4 inch and 3/8 inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material, may be utilized to form such pebbles. Silicon carbide, alumina, periclase, thoria, beryllia, Stellite, zirconia, and mullite may be satisfactorily used to form such pebbles or may be used in admixture with each other or with other materials. Pebbles formed of such materials, when properly fired, serve very well at high temperatures. Pebbles which are used may be either inert or catalytic, as used in any selected process.

Our invention is not limited to the utilization of a moving pebble mass but as described hereafter, is often well applied to the utilization of a fixed pebble bed.

When converting reactants in conventional pebble heater apparatus unreacted reactants and reaction products continue to react in the space above the pebble bed. Since the space above the pebble bed, however small, is free from pebbles the rate of flow of effluents from the top of the hot pebble bed to the top of the apparatus is relatively slow. Usually it is impossible to prevent some decomposition of desired reaction products, at the elevated temperatures, as they pass through such a space. Hydrocarbon effluents form deposits of carbon and carbonaceous materials on the surface of the reaction chamber above the pebble bed. The accumulation of such carbon deposits on the reaction chamber surface finally reaches such proportions as to seriously interfere with the removal of reaction products through the effluent outlet of the reaction chamber. Additional trouble is encountered when large fragments of the accumulated carbon material separate from the surface of the reaction chamber and pass downwardly through the chamber with the fluent mass of pebbles and become lodged in the pebble outlet of the chamber, thus reducing or preventing the flow of pebbles through the pebble heater apparatus.

A further disadvantage arising from the utilization of conventional pebble heater apparatus in the conversion of a reactant material, is the inherent delay in quenching the resulting reaction product, causing an unduly large amount of overreacting and inefficient utilization of reactant materials.

Our invention is concerned with the utilization of a heated pebble mass having a layer of fluidizable, solid heat transfer material at a lower temperature than the pebble mass superposed thereon, whereby heat is efficiently transferred to the reactant material and the resulting reaction product is quickly and efficiently quenched, and whereby the accumulation of carbonaceous matter on the reaction chamber inner surface is eliminated when converting hydrocarbons.

An object of our invention is to provide for the conversion of reactant materials at elevated temperatures, and for quickly quenching the resulting reaction product.

Another object is to provide for quickly quenching reaction product in a pebble heater apparatus.

Another object is to prevent the accumulation and deposition of carbon in a reaction chamber during the conversion of hydrocarbons therein at elevated temperatures.

Another object is to provide apparatus wherein a reactant material is converted at elevated temperatures and wherein the resulting reaction product is quickly quenched in the reaction chamber.

Another object is to provide for the conversion of hydrocarbons.

Another object is to provide for the oxidation of nitrogen to produce nitric oxide wherein the resulting oxidation reaction mixture is quickly quenched while still in the reaction chamber.

Another object is to provide for the conversion of a reactant material at a temperature within the range of from 500 to 4500° F. and for quickly quenching the resulting reaction mixture to a predetermined temperature below the reaction temperature, whereby undesirable side reactions ordinarily taking place as a result of the inherent delay in quenching the reaction mixture, are eliminated.

Other objects will be apparent to one skilled in the art from the accompanying discussion and disclosure.

In accordance with one embodiment of our invention, we provide for contacting a fluid reactant material with a heated mass of solid particulate material to convert the reactant, and then for quickly quenching the resulting reaction product emerging from the solid particulate mass by passing it through a layer of fluidizable solids superposed on the top surface of the solid particulate mass and maintained at a temperature lower than that of the particulate heat transfer material. Gaseous reactants are preferably passed upwardly through the heated contact mass at a linear velocity sufficiently high to maintain the superposed layer in dense phase suspension. Particles of the fluidized layer, absorbing heat from the reaction effluent are continuously removed from the reaction chamber, cooled and returned. In the conversion of hydrocarbons, or other carbon-containing reactants, this invention provides for eliminating the accumulation of carbonaceous matter in the upper portion of the reaction chamber. Tarry or other carbon-forming materials in the gaseous product are condensed on the surfaces of the cooler fluidized particles, which as above stated, are removed, freed of carbonaceous matter, preferably by burning, cooled and returned to the reaction chamber.

In one embodiment of our invention we pass reactant gases through the heated solid particulate mass at a linear velocity exceeding the transport velocity of the solid particles in the superposed layer, thereby causing these particles to be carried out of the reaction chamber. In this type operation the solid particles and gaseous effluent are separated at a point outside the reaction chamber and the separated solids are freed of any carbonaceous materials, cooled, and returned to the reaction chamber.

Figure 2:
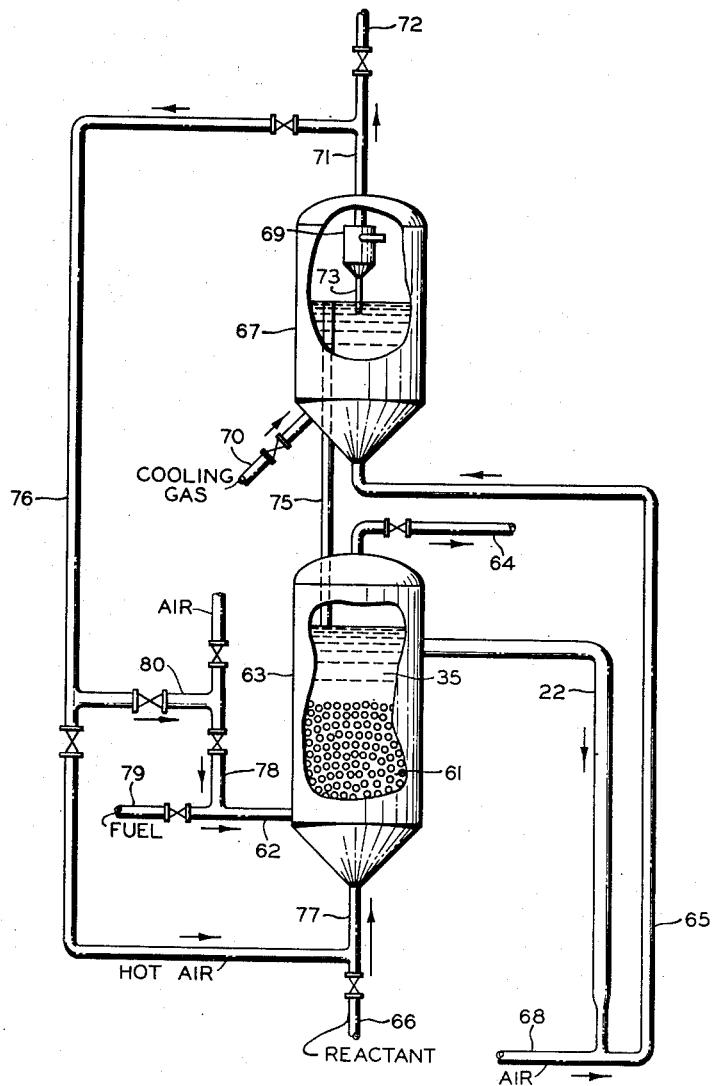

Understanding of the invention will be facilitated upon reference to the diagrammatic drawings in which Figure 1 is a schematic elevation, partly in section, of a modified pebble heater apparatus of this invention. Also diagrammatically represented in Figure 1 is auxiliary equipment used in conjunction with the modified pebble heater apparatus. Figure 1 is illustrative of an embodiment of our invention wherein we utilize a moving contiguous pebble mass and a moving fluidized bed of solids superposed as a layer on the top surface of the pebble mass, in conducting a conversion step at elevated temperatures and quickly quenching the reaction product in the reaction chamber. Figure 2 is a schematic elevation, partly in section, illustrative of another embodiment of our invention wherein, instead of a moving pebble mass, as illustrated in Figure 1, we utilize a fixed bed of pebbles main- tained at a desired reaction temperature, together with a layer of a fluidizable solid particulate material superposed on the top surface of the pebble mass.

Referring to Figure 1, pebble heater chamber 11 is provided with a pebble inlet conduit 12 and effluent conduit 13. Combustion chamber 10 is positioned subjacent pebble heating chamber 11. Chambers 10 and 11 are separated by perforate support 9 through which combustion gas formed in chamber 10 ascends. Fuel gas inlet conduit 8 is connected with chamber 10 and admits fuel gas thereinto for combustion through conduits 4 and 5. Conduit 7, connected with chamber 10 by conduits 4 and 5, admits air or other combustion supporting gas into chamber 10, in admixture with fuel gas. A plurality of pebble outlets 14 extends from pebble heating chamber 11 in communication with pebbles therein, downwardly and equidistantly into reaction chamber 16, and terminates therein at points generally near the middle, dependent on the specific bed depths required. Pebble outlet conduit 17 is provided in the lower portion of reaction chamber 16 and communicates with elevator 19 by means of pebble conduit 18. Pebble feeder 21 is provided in conduit 18 to control the flow of pebbles therethrough. Conduits 22 are in communication with chamber 16 and are connected thereto at points 20 about the periphery of its upper portion, preferably near the top, and in a preferred embodiment terminate into a central header 23. Conduits 22 are in communication with solids in layer 35 in chamber 16. Cyclone separator 24 is disposed in the upper portion of chamber 16 above points 20 and is connected at a point in its upper portion with outlet conduit 26 to deliver effluent gas thereto substantially free of suspended solids. Outlet conduit 26 extends through the top of chamber 16. Conduit 27 is connected to the lower portion of cyclone separator 24 and extends downward into chamber 16 terminating below point 20 to return solids thereto separated in separator 24. Cyclone separator 28 receives fluidized solids from conduit 42 fed by means of a gas lift and serves to separate the solid particles from the lift gas. Conduit 31, connected to the upper portion of separator 28, receives gas therefrom substantially free of suspended solids. Fluidized solids conduit 29 connected to the lower portion of separator 28 extends through into the upper portion of zone 16 terminating therein below point 20 to deliver solids from zone 28.

In the operation of the apparatus illustrated in Figure 1, pebbles are passed through pebble inlet conduit 12 into the upper portion of pebble heater chamber 11 so as to form a contiguous fluent gas-pervious mass of pebbles 37 extending from inlet 12 through chamber 11, pebble conduits 14, chamber 16 and line 17 down to feeder 21. Fuel from conduit 8 and air from conduit 7 are supplied to combustion chamber 10 through lines 5, and the fuel is burned therein. Hot combustion gas thus formed is passed upwardly through the fluent pebble mass 37 in direct heat exchange therewith to heat the pebbles to a predetermined temperature for effecting conversion of a reactant material when in contact therewith in chamber 16. Generally, it is necessary to heat the pebble mass 37 in chamber 11 to a temperature from about 100 to about 500° F. above that required in the subsequent conversion step. In most instances it is desirable to heat the pebble mass in chamber 11 to a temperature within the range of about 1500 to 4000° F., dependent of course upon the specific reaction that is to take place in the reaction chamber 16. The proportion of oxygen and fuel and the quantity of these gases burned, can be selected so that combustion gas at the necessary temperature level and in the necessary quantity is provided to heat the pebbles to the desired temperature. In some instances it is desirable to preheat the air in order to develop the maximum combustion gas temperatures in chamber 10.

In other embodiments not specifically illustrated, fuel can be burned directly on the pebble surfaces, or hot gases from a source external to chamber 10 can be introduced through conduit 8 for effecting the desired heat exchange in chamber 11.

Flue gas is removed from the upper portion of chamber 11 through conduit 13. Hot pebbles are passed from chamber 11 to chamber 16 through conduits 14. We prefer to employ a plurality of conduits 14 in order that the surfaces 36 of pebble mass 37 will more nearly approach a horizontal plane.

Fluidized solids at a temperature below that of the hot pebbles from zone 16, and having a particle mesh size generally within the limits of from 60–200 mesh, i. e. particles of a size that will pass through a sieve having 60 openings per linear inch, but which will not pass through a sieve having more than 200 openings per linear inch, are introduced into chamber 16 and therein superposed on pebble mass 37 as layer 35. This is done by introducing fluidized solids from line 29 into chamber 16, either from fresh solids conduit 38 or from cooler 39, conduits 41, 42 and separator 28 as further discussed hereafter.

Reactant material is supplied to the lower portion of chamber 16 through conduit 34 and passed upwardly through chamber 16 in direct heat exchange with hot pebbles therein. The hot pebbles, previously heated in chamber 11, supply the heat necessary for effecting the desired reaction of the reactant materials in contact therewith. Reaction products leaving the pebble bed are passed through the relatively cool layer of solids 35 at a rate such that a dense phase fluidized bed is maintained in zone 35, and preferably such that solid particles do not pass from zone 35 into the subjacent pebble mass 37.

When reacting hydrocarbons, heavy tarry products and other potential carbon-forming materials such as polyolefinic product, etc. which may condense on the relatively cool walls of chamber 16 and eventually carbonize to form an undesirable accumulation of carbonaceous materials in the chamber, condense instead on the relatively cool fluidized particle surfaces. The fluidized particles are in a high state of agitation and the "coke" buildup on the individual particles is small and no agglomeration of particles can occur. These solid particles bearing carbonaceous matter deposited on their surfaces are removed from chamber 16, regenerated in regeneration zone 46, cooled in cooler 39 and returned to quench zone 35. When employing reactants of any type, the fluidized layer 35 utilized exactly in the manner already described, serves to quickly quench gases emerging from the pebble mass. Hot solids are passed via conduits 22 to header 23 and transferred by gas lift to regeneration zone 46. This can be done by passing solid particles from header 23 into line 43 and moving them into regeneration chamber 46 by a stream of air introduced into line 43, upstream from header 23, through conduit 44. The temperature of the fluidized particles passed from header 23 is often as high as from 500 to 1500° F. and in some cases higher, thereby causing carbonaceous deposits on the fluidized particle surface to start to burn upon contact with air. Air is introduced through line 44 in an adequate quantity to at least partially burn carbonaceous material free from the particle surfaces in zone 46. Regeneration off gas, comprising combustion gases together with any excess air or inert lift gas, is separated from solid fluid particles in zone 46 by means of cyclone separator 47. Regeneration off gas substantially free from solids is passed from separator 47 through gas effluent conduit 48. Solids separated in separator 47 are returned to the main body of solids in zone 46, through conduit 49. Hot solids are passed through overflow conduits 51 to solids cooler 39 where they are cooled to the desired temperature level, usually from 200 to 1000° F. below the pebble temperature in zone 16. Cooling can be effected in zone 39 by dispersing cooling gas through the main body of solids therein, from conduit 52. Cooling gas and solids are separated in zone 39 by means of cyclone separator 53. Effluent gas substantially free of solids is passed from chamber 39 through conduits 54 and 55 and solids in separator 53 are returned to the main solids body in zone 39 through line 56. Regenerated cool solids are withdrawn by gravity from zone 39 through overflow line 41 and passed into line 42 and into separator 28 by means of a gas lift, usually air introduced into line 42 from line 57, upstream from line 41. Lift-gas is separated from solids in cyclone separator 28 and discharged through line 31. Solids thus regenerated, cooled and returned from zone 39 are reintroduced into zone 16 through conduit 29. In some cases it is desirable to preheat either the fuel gas, the combustion supporting gas or both, prior to their introduction for burning in zone 10. One convenient manner in which this embodiment may be practiced is that of introducing air as the cooling gas through line 52 into zone 39 and passing the effluent heated air from zone 39 through lines 54 and 58 into line 7.

The quantity of solids in zone 35 and the rate at which solids are added to and withdrawn from this zone will be determined by the amount of cooling required. In any case it is necessary to have layer 35 of sufficiently great volume to completely cover the pebble mass in the reaction chamber 16.

With reference to Figure 2 we have illustrated an embodiment of our invention employing a fixed pebble mass 61. Heat is supplied to fixed pebble mass 61 by hot heat exchange gases introduced through line 62 into the lower portion of chamber 63 and passed upwardly in heat exchange relation therewith; effluent heat exchange gases are withdrawn from chamber 61 through gas effluent line 64. Reactant material is introduced through lines 66 and 77 and passed in the gaseous state, through pebble mass 61 at the requisite conversion temperature level, and quenched at a linear velocity sufficiently high to maintain solids 35 as a fluidized fixed bed. The temperature of solids 35 is lower than that of pebble bed 61, whereby the resulting reaction products emerging from the pebble bed are quenched in contact with solids 35 to the desired temperature, and the quenched product is withdrawn from chamber 63 through effluent line 64. Effluent gases are withdrawn via line 64 and the desired products separated by means not specifically illustrated. Particles of solids 35 are withdrawn from chamber 63 through line 22 and passed through line 65 to cooling zone 67. This is done by means of a lift-gas introduced into line 65 from line 68 upstream from the point of introduction of solids from line 22. Lift-gas in the upper portion of chamber 67 is separated from any suspended solids therein by means of cyclone separator 69 and discharged through lines 71 and 72. The temperature of the lift-gas and the quantity employed can be regulated to effect the desired cooling of solids in chamber 67, by direct heat exchange therewith. However, if desired, a supplemental stream of cooling gas can be introduced into the lower portion of chamber 67 through conduit 70 and passed in direct heat exchange with fluidized solids to be cooled. Gas thus introduced can be withdrawn from chamber 67 as already described. Solids separated by separator 69 are returned to the main body of solids in chamber 67 through line 73. Cooled fluidized solids are withdrawn from zone 67 through overflow line 75 and returned to chamber 63 to maintain relatively cool fluidized fixed bed 35. This embodiment as illustrated in Figure 2 is particularly adapted to the oxidation of nitrogen to nitric oxide. In such a specific process, reactant air is conveniently employed as a lift-gas from line 68 and is heated in contact with hot particles from solids layer 35 in chamber 63, while lifting them through line 65 into cooling chamber 67. Lift-air heated by transfer of heat from the hot solids in chamber 67 is passed therefrom through lines 71, 76 and 77 into pebble mass 61 as the reactant gas. In this instance, pebble mass 61 is necessarily maintained at a temperature as high as about 3500 to 4500° F. and this is most conveniently done by burning fuel gas in the lower portion of chamber 63 to provide combustion gases at the requisite high temperature, in the manner already discussed. In carrying out the combustion, preheated air is introduced into pebble mass 61 from line 76, via line 80 and 78, and fuel is introduced from line 79. Nitrogen and oxygen react in contact with pebble mass 61 to form nitric oxide at the requisite high temperature above discussed, and in order to obtain a high yield of nitric oxide it is necessary to quickly quench the reaction effluent to a temperature below about 1500 to 2500° F. This is done by passing the gaseous stream emerging from pebble mass 61 through the cooler superposed solids 35, by means of which the reaction effluent is almost instantaneously quenched. Hot particles from mass 35 are continuously withdrawn from chamber 63 through line 22 as already discussed, cooled in chamber 67 to the required low temperature and returned through line 75 into chamber 63, at a rate sufficiently high as to maintain solids 35 at the proper temperature level. Quenched nitric oxide-containing product is withdrawn from chamber 63 through line 64. It is generally advantageous to employ a cyclone separator in the upper portion of chamber 63 in the manner already illustrated in Figure 1.

In the conversion of hydrocarbons in the practice of this embodiment, it is most advantageous to employ a plurality of chambers so that any carbon gradually accumulating on pebble surfaces can be removed by any well known cyclic type of regeneration.

Linear reactant gas velocities employed in the practice of our invention, are preferably sufficiently high to satisfactorily fluidize the fluid layer. Linear velocities of gases leaving the pebble mass within the range of from 0.5 to 5 feet per second, are generally satisfactory for fluidization, and for that reason it is preferable to employ such linear velocities as a minimum. However, it is within the scope of our invention to operate at a higher linear velocity as has already been discussed, even though such a rate may exceed the transport velocity of the fluid layer.

We have illustrated our invention in terms of a plurality of pebble inlets 14 although a single substantially axially disposed inlet may be employed, if desired. We prefer a plurality of such pebble inlets for the reason that the pebbles will have less tendency to move across the surface of the pebble bed, and will be exposed to a lesser degree to the cooling effect of the fluidized bed. Also, the surface of the reaction pebble bed will be more nearly uniform to match the almost flat surface of the fluidized mass and thus providing for a uniform pressure drop in all segments of the bed.

In initiating the preferred process of our invention, the pebbles may be heated and their circulation started while an inert gas flows through the reaction chamber at the desired rate. The fluidized solids are then added. The upflowing gas immediately fluidizes the solids and a fluidized fixed bed is built up to the desired depth. Reaction feed is introduced as soon as the desired pebble operating temperature is established.

Fluidized solids are preferably withdrawn from the reaction chamber, from a plurality of points at the periphery of the chamber, thus permitting a uniform flow of fluid solids through the fluidized bed, sufficient to keep the quench temperature as low as desired.

It will be obvious to one skilled in the art that the fluidized bed depth may be varied by such means as varying the levels of fluid outlets 22 and inlet 29 to maintain the fluidized bed at the desired thickness.

Various other modifications will be apparent to those skilled in the art upon study of the accompanying disclosure. Such modifications may be made without departing from the spirit and the scope of the disclosure.

We claim:

1. An improved process for reacting hydrocarbons, which comprises heating a fluent mass of pebbles in a pebble heating zone to a temperature sufficiently high to cause a hydrocarbon reactant when in contact therewith to be converted, passing pebbles thus heated into a reaction zone and downwardly to form a contiguous pebble mass therein, passing a stream of fluidizable particulate solids at a temperature lower than that of said pebbles into the upper portion of said reaction zone so as to form a superposed layer on said pebble mass, passing a hydrocarbon reactant material into the lower portion of said reaction zone and upwardly therethrough in direct heat exchange with said pebble mass, whereby conversion of said hydrocarbon takes place, passing product gases upwardly from said pebble mass through said superposed layer at a linear velocity sufficiently high to maintain said layer as a fluidized fixed bed, whereby said reaction product is quenched and tarry materials condense from said product gases and accumulate on the solid particle surfaces, withdrawing a stream of solids from said superposed layer in said reaction zone and regenerating same by removing carbonaceous deposits therefrom, cooling regenerated solids and returning cooled, regenerated solids to said superposed layer in said reaction zone, removing pebbles from the lower portion of said reaction zone, and removing quenched reaction products from the upper portion of said reaction zone.

2. An improved process for reacting hydrocarbons, which comprises the steps of passing a fluent mass of pebbles into a pebble heating zone and downwardly therein by gravity, passing a hot gaseous heat exchange material upwardly through said pebble heating zone in direct heat exchange with said pebble mass to heat same to a temperature sufficiently high to cause a hydrocarbon reactant when in contact therewith to be converted, removing effluent material from the upper portion of said pebble heating zone, passing said pebble mass thus heated through a reaction zone and downwardly therein to form a contiguous pebble mass, passing a stream of fluidizable solid particulate material containing particles of a size within the limits of 60 to 200 mesh at a predetermined temperature below that of said heated pebble mass into said reaction zone to form a layer of said fluidizable solids superposed on said pebble mass, passing said hydrocarbon reactant material into the lower portion of said reaction zone and upwardly therethrough in direct heat exchange with said heated pebble mass, whereby conversion of said hydrocarbon take place, passing resulting reaction product upwardly from said pebble mass through said superposed layer at a linear velocity higher than 0.5 feet per second and not exceeding the transport velocity of said particles in said superposed layer, whereby said reaction product is quenched and said layer is maintained as a fluidized fixed bed and tarry reaction products condense from said reaction product and accumulate on the surfaces of particles in said layer, withdrawing a stream of solids from said superposed layer in said reaction zone and regenerating same by burning carbonaceous deposits from the particle surfaces thereof, cooling regenerated solids, returning cooled regenerated solids to said layer in said reaction zone, removing pebbles from the lower portion of said reaction zone and returning same to said pebble heating zone, and removing quenched reaction products from the upper portion of said reaction zone.

3. A process for the reaction of nitrogen with oxygen to produce nitric oxide, and for quenching total reaction product of said reaction; comprising heating a fixed bed of pebbles to a temperature within the limits of 3000 to 4500° F.; passing a stream of fluidizable solids at a temperature sufficiently low to cool gases passed in contact therewith and previously contacted with said fixed pebble bed, to 1500–2500° F. on to said pebble bed to form a superposed layer thereon; passing air through said pebble bed whereby nitrogen reacts with oxygen to form nitric oxide; passing resulting reaction product upwardly from said pebble mass through said superposed layer at a linear velocity sufficiently high to maintain said layer as a fluidized fixed bed, whereby total reaction product is quenched to a temperature sufficiently low to substantially prevent decomposition of nitric oxide present therein; withdrawing a stream of solids from said layer and cooling same to said fluidizable solids temperature, returning such cooled solids to said layer; and recovering nitric oxide from said total quenched reaction product.

4. An improved process for converting a reactant material at an elevated temperature when in contact with a heated pebble mass, and for quickly quenching the resulting conversion product, comprising passing a fluent mass of pebbles into the upper portion of a pebble heating zone and downwardly therein by gravity, passing a hot gaseous heat exchange material upwardly through said pebble heating zone in direct heat exchange with said pebble mass to heat same to a temperature sufficiently high to cause said reactant material when in contact therewith to be converted, removing gaseous effluent from the upper portion of said pebble heating zone, passing said pebble mass thus heated through the upper portion of a reaction zone and downwardly therein to form a contiguous pebble mass, passing a stream of solid particulate fluidizable material containing particles of a mesh size within the limits of 60 to 200, and at a temperature lower than that of said heated pebble mass, into said reaction zone to form a superposed layer on said pebble mass, passing said reactant material into the lower portion of said reaction zone and upwardly therethrough in direct heat exchange with said heated pebble mass, whereby said reactant is converted, passing reaction product upwardly from said pebble mass through said superposed layer at a linear velocity sufficiently high to maintain said layer as a fluidized fixed bed and not exceeding the transport velocity of particles in said layer, whereby said reaction product is quenched to a temperature so low as to substantially prevent undesirable side reactions involving reaction product, withdrawing a stream of particles from said fluidized fixed bed in said reaction zone and cooling same, returning cooled particles thus cooled to said layer in said reaction zone, removing pebbles from the lower portion of said reaction zone and returning same to said pebble heating zone, and removing quenched reaction products from the upper portion of said conversion zone.

5. An improved process for reacting hydrocarbons, which comprises heating a fluent mass of pebbles in a pebble heating zone to a temperature sufficiently high to cause a hydrocarbon reactant when in contact therewith to be converted, passing pebbles thus heated into a reaction zone and downwardly to form a contiguous pebble mass therein, passing a stream of fluidizable particulate solids at a temperature lower than that of said pebbles into the upper portion of said reaction zone so as to form a superposed layer on said pebble mass in direct contact with said pebble mass and completely covering said pebble mass, passing a hydrocarbon reactant material into the lower portion of said reaction zone and upwardly therethrough in direct heat exchange with said pebble mass, whereby conversion of said hydrocarbon takes place, passing product gases upwardly from said pebble mass through said superposed layer at a linear velocity sufficiently high to maintain said layer as a fluidized fixed bed, whereby said reaction product is quenched and tarry materials condense from said product gases and accumulate on the solid particle surfaces in said fluidized fixed bed, withdrawing a stream of solids from said superposed layer in said reaction zone and regenerating same by removing carbonaceous deposits therefrom, cooling regenerated solids and returning cooled solids thus regenerated to said superposed layer in said reaction zone, removing pebbles from the lower portion of said reaction zone, and removing quenched reaction products from an upper portion of said reaction zone.

6. An improved method for converting a reactant material when in the gaseous state, which comprises heating a fluent mass of pebbles to a temperature sufficiently high to cause said reactant material when in contact therewith to be converted; continuously passing fluidizable solids at a temperature lower than that of said pebbles as a layer superposed on the resulting heated pebble mass; passing said reactant material into the lower portion of said mass of heated pebbles and upwardly therethrough in direct heat exchange with said pebble mass, whereby conversion of said reactant material takes place; passing reaction product upwardly from said pebble mass through said superposed layer at a linear velocity sufficiently high to maintain said fluidizable solids as a fluidized bed superposed on the upper surface of said pebble mass, whereby said fluidized bed absorbs heat from said reaction product to quench same; continuously withdrawing fluidizable solids from said quench layer at a temperature higher than that at which they are introduced; and recovering quenched reaction product from said quench zone.

References Cited in the file of this patent
UNITED STATES PATENTS

| | | |
|---|---|---|
| 1,687,118 | Winkler | Oct. 9, 1928 |
| 2,466,005 | Crowley | Apr. 5, 1949 |
| 2,471,104 | Gohr | May 24, 1949 |
| 2,479,496 | Keith | Aug. 16, 1949 |
| 2,503,291 | Odell | Apr. 11, 1950 |
| 2,512,259 | Pike | June 20, 1950 |
| 2,538,219 | Welty | Jan. 16, 1951 |
| 2,554,407 | Hepp | May 22, 1951 |